United States Patent [19]

Favret

[11] Patent Number: 4,992,995
[45] Date of Patent: Feb. 12, 1991

[54] METHODS FOR ATTENUATING NOISE IN SEISMIC DATA

[75] Inventor: Paul D. Favret, Houston, Tex.

[73] Assignee: Amoco Corporation, Chicago, Ill.

[21] Appl. No.: 426,127

[22] Filed: Oct. 24, 1989

[51] Int. Cl.$^5$ .......................... G01V 1/36; G01V 1/28
[52] U.S. Cl. ........................................ 367/43; 367/46; 367/73; 364/421
[58] Field of Search ....................... 367/15, 43, 46, 73; 381/47; 364/421, 424.5

[56] References Cited

U.S. PATENT DOCUMENTS

| | | | |
|---|---|---|---|
| 4,218,765 | 8/1980 | Kinkade | 367/45 |
| 4,852,068 | 7/1989 | Track | 367/57 |
| 4,907,205 | 3/1990 | Yanchak | 367/52 |

FOREIGN PATENT DOCUMENTS 2217458  10/1989  United Kingdom .

OTHER PUBLICATIONS

Wang et al., "Attenuation of Marine Coherent Noise", 59th Annu. Loc. Exp. Geo. Int Mtg., 11/2/89, pp. 1112–1114 abst only provided.
Jones et al., "Signal-to-Noise . . . Transform", Geophys. Pros., vol. 35, #1, pp. 12–32, 1/87, abst. only.
Ryu, J., "Decomposition of Seismic Gathers Into Velocity Components by Space-Time Filter", 50th Annual SEG International Meeting (Nov., 1980).
Gulunay, N., "FXDECON and the Complex Wiener Prediction Filter for Random Noise Reduction on Stacked Data", 56th Annual SEG Meeting, Houston, (1986), pp. 279–281.

Primary Examiner—Nelson Moskowitz
Attorney, Agent, or Firm—Timothy D. Stanley

[57] ABSTRACT

The present invention relates generally to methods of enhancing seismic data and, more particularly, to methods of attenuating noise in seismic signals. The seismic data are sorted into gathers of seismic signals, and selected coherent events in each gather of seismic signals are aligned. The gathers of seismic signals are then processed so as to transform the balance of the coherent events in each gather of seismic signals into incoherent events. A two-dimensional filter is then applied to the transformed signals to attenuate incoherent events.

22 Claims, 12 Drawing Sheets

METHODS FOR ATTENUATING NOISE IN SEISMIC DATA

The present invention relates generally to methods for enhancing seismic data and, more particularly, to methods for attenuating noise in seismic data.

In seismic prospecting, it is conventional to place a plurality of seismic receivers along the earth's surface at spaced locations. A plurality of seismic sources disposed at spaced locations along the earth's surface can then be activated to generate seismic waves which propagate outwardly in all directions. Vibrating devices, explosive devices, and impulsive devices are exemplary of such seismic sources. The seismic waves thus generated are reflected, refracted and diffracted from subsurface formation interfaces, and some of these diverted seismic waves are detected by the seismic receivers and can be processed as seismic signals. Such seismic signals can be displayed as seismic sections which contain information about the time, duration and intensity of the diverted seismic waves. The seismic sections can be studied to extrapolate information regarding the type and location of subsurface formations producing the diverted seismic waves. This information can, in turn, be employed to evaluate the subsurface formations for oil- and gas-bearing properties.

Seismic energy which has generally been reflected only once from a reflecting subsurface interface is commonly referred to as a primary; whereas, seismic energy which has been reflected more than once from a reflecting subsurface interface is commonly referred to as a multiple. Such reverberating seismic energy can produce multiple or secondary reflection events in seismic data for one or more reflecting interfaces in the earth. Consequently, the presence of multiple reflection events or, more simply, multiples in the seismic data, can result in confusing and, oftentimes, non-interpretable seismic data as seen in FIG. 1.

One method for suppressing multiple reflection events in seismic data is to sort the seismic data into ordered gathers of seismic signals (e.g., common depth point (CDP) gathers of seismic signals) and then normal moveout correcting and dip filtering the moveout corrected signals of the CDP gather. The utility of this technique depends upon differences in the moveout velocities for the primary and multiple reflection events for the dip filter to effectively attenuate multiple reflection events. Unfortunately, at near offsets (i.e., short separation distances between the initiating seismic source and the recording seismic receiver), the difference in moveout for primary and multiple reflection events can be negligible. As such, dip filtering can be ineffective to remove multiple reflection events at near offsets. Dip filtering comprises a variety of velocity filters also referred to as fan filters, f-k filters and pie-slice filters. Typically, such velocity filters operate on Fourier transformed seismic signals.

Alternatively, J. Ryu described in "Decomposition of Seismic Gathers Into Velocity Components by Space-Time Filter," 50th Annual SEG International meeting (Nov. 17-21, 1980), a method for identifying and isolating various reflection events in common depth point gathers of seismic data to remove unwanted reflection events. In particular, Ryu describes overcorrecting primary reflection events and undercorrecting multiple reflection events for normal moveout to first separate primary reflection events from multiple reflection events in CDP ordered gathers of seismic signals and then employing a two-dimensional filter to suppress the multiples. Such technique, however, is also dependent upon the differences in normal moveout velocities for multiples and primary reflection events.

Current techniques for attenuating multiples employ ordered gathers of seismic signals (e.g., common depth point and common endpoint) and rely on differences in normal moveout velocity separation to distinguish primary reflection events from multiple reflection events. At near offset distances, where moveout velocities are coincident between primary and multiple reflection events, these techniques break down due to the inherent limitations of dip filtering techniques. The present invention is more effective in attenuating both coherent and random noise across all offset distances because it takes advantage of the predictable nature of aligned primary-reflection events in randomly sorted gathers of seismic signals and the unpredictable, noncoherent nature of dipping multiple reflection events in randomly sorted gathers of seismic signals. This phenomenon allows the present invention to effectively attenuate both coherent and random noise over all offset distances without requiring the use of a dip filter.

SUMMARY OF THE INVENTION

The present invention relates generally to methods for enhancing seismic data and, more particularly, to methods for attenuating noise in seismic data.

In processing seismic data to attenuate noise, the seismic data are sorted into gathers of seismic signals. Preferably, the gathers comprise ordered gathers selected from the group including: common depth point, common endpoint, incident angle-ordered, and offset distance-ordered gathers of seismic signals. Selected coherent events in each of the gathers of seismic signals are aligned, and the balance of the coherent events in each of the gathers of seismic signals are transformed into incoherent events. A two-dimensional filter can then be applied to the gathers of seismic signals so as to attenuate incoherent events.

In one embodiment of the present invention, the aligned coherent events comprise primary reflection events. In another embodiment of the present invention, the coherent events comprise coherent noise, such as multiple reflection events, ground roll, refractions, and direct arrivals.

In another aspect of the invention, each ordered gather of seismic signals is sorted, after primary reflection events have been horizontally aligned, into a disordered gather of seismic signals so as to transform dipping multiple reflection events in each ordered gather of seismic signals into incoherent events. Preferably, each gather of seismic signals is stochastically sorted into a random-ordered gather of seismic signals. The stochastically sorted seismic signals can then be two-dimensionally filtered to attenuate the dipping multiple reflection events in the disordered gather of seismic signals. In fact, the steps of stochastically sorting the seismic signals followed by two-dimensional filtering can be repeated several times so as to maximize the transformation of the dipping multiple reflection events into incoherent events and minimize the residual amount of such incoherent events remaining in the disordered gather of seismic signals after two-dimensional filtering.

Alternatively, when the aligned coherent event comprises coherent noise, the two-dimensionally filtered gather of seismic signals can provide an estimate of the coherent noise in the seismic signals. By repeating the steps of aligning other coherent noise events in each gather of seismic signals and two-dimensional filtering, one can develop a composite estimate of the noise in the gather of seismic signals. Combining the composite noise signal of each gather with the original gather of seismic signals, a set of seismic data can be obtained having enhanced signal-to-noise ratio.

While many seismic processing methods have been specifically developed to attenuate multiple reflection events in seismic data employing dip filtering of common depth point and common endpoint gathers of seismic signals, such methods depend primarily upon the differences in normal moveout velocity separation to distinguish primary reflection events from multiple reflection events. Unfortunately, these methods break down because normal moveout velocities can be coincident at near offset distances leaving substantial unwanted, residual multiple reflection events in the seismic data. The present method advantageously employs the statistical advantages of stochastically sorting the gathers of seismic signals. The stochastic sorting transforms dipping multiple reflection events into incoherent events and thus nonpredictable, while the primary reflection events remain coherent, and thus predictable. By applying a two-dimensional filter to the stochastically sorted seismic signals, coherent events can be passed and random events can be attenuated. The present invention can thus provide a more effective method for suppressing both coherent and random noise across all offset distances than present dip filter techniques.

DETAILED DESCRIPTION OF THE INVENTION

The present invention relates generally to methods for enhancing seismic data, and, more particularly, to methods for attenuating noise in seismic data.

In order to better understand the present invention, the following introductory discussion is provided. In seismic data acquisition, multiple seismic signals for a common reflection point can be recorded by sets of seismic receivers to seismic energy imparted by seismic sources. For flat, horizontal reflecting interfaces in the earth's subsurface, such technique is generally referred to in the art as "common depth point" (CDP) whereby the ray paths from the seismic sources to the seismic receivers are depicted as reflecting from a common reflection point. Alternatively, seismic data can be sorted into a variety of sequentially-ordered gathers of seismic signals such as: common depth point (CDP), common endpoint (CEP), incident angle ordered, and offset distance ordered gathers of seismic signals.

Recently N. Gulunay in "FXDECON and the Complex Wiener Prediction Filter for Random Noise Reduction on Stacked Data," 56th Annual SEG Meeting, Houston, Tex., (1986, pp. 279-281) described a new type of two-dimensional filter for attenuating random noise in stacked seismic signals. Unlike conventional dip filters which operate in the frequency-wave number (F-K) domain, the spatial filter of Gulunay operates in the frequency-space (F-X) domain. In particular, the spatial filter can be designed to operate within a specified frequency band and over selected offset distances. The spatial filter is thus adapted to affect only the specified frequencies but does not affect events linear in space and time. Conversely, the spatial filter does not affect the seismic data outside the specified frequency band irrespective of whether or not the events are linear in time and space.

Figure 2:
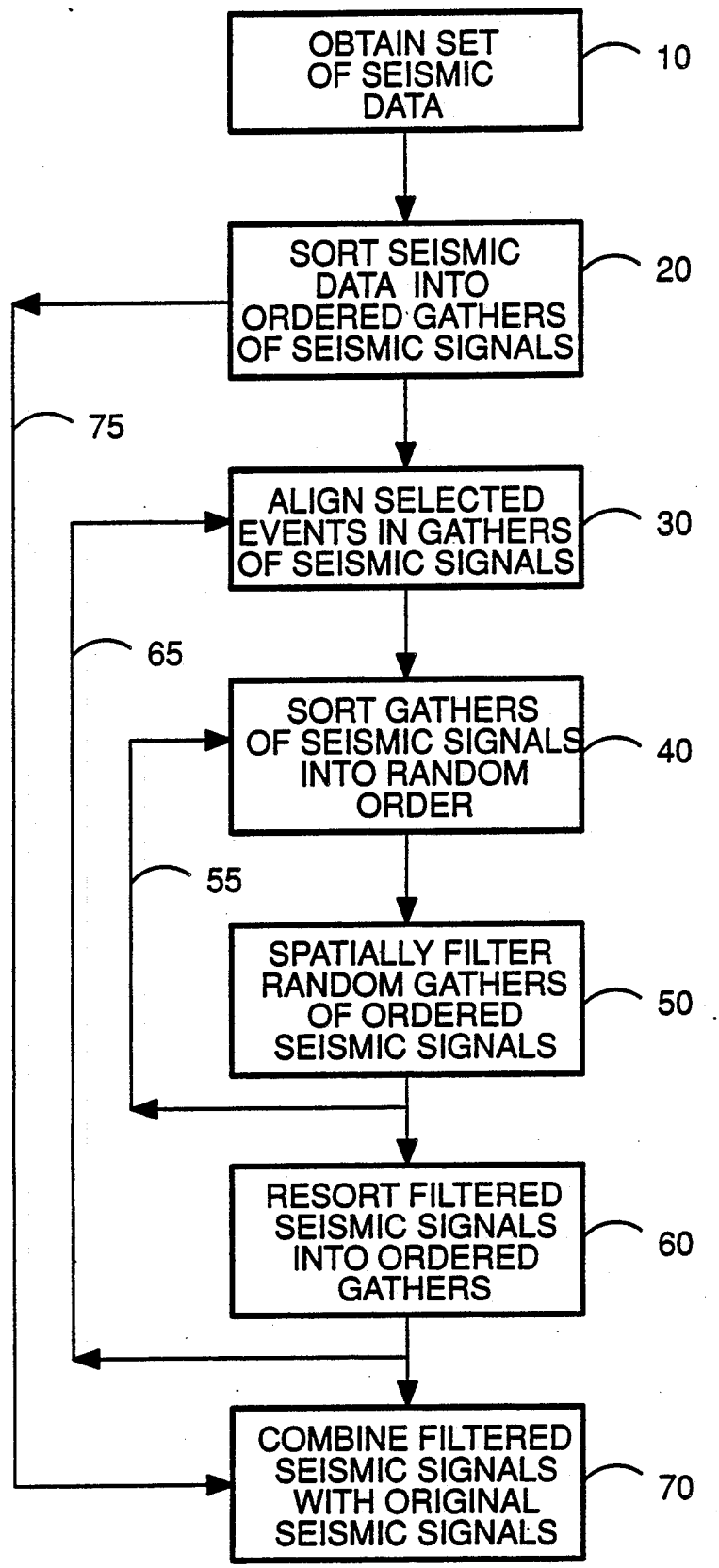
FIG. 2 is a flow diagram of the present invention.

Looking now to FIG. 2, a flow diagram for carrying out the present invention is provided. At step 10 a set of seismic data is obtained and at step 20 the seismic data are sorted into gathers of seismic signals. Preferably, the seismic signals are sorted into sequentially-ordered gathers such as common depth point (CDP), common endpoint (CEP), incident angle-ordered, and offset distance-ordered gathers of seismic signals.

Figure 1:
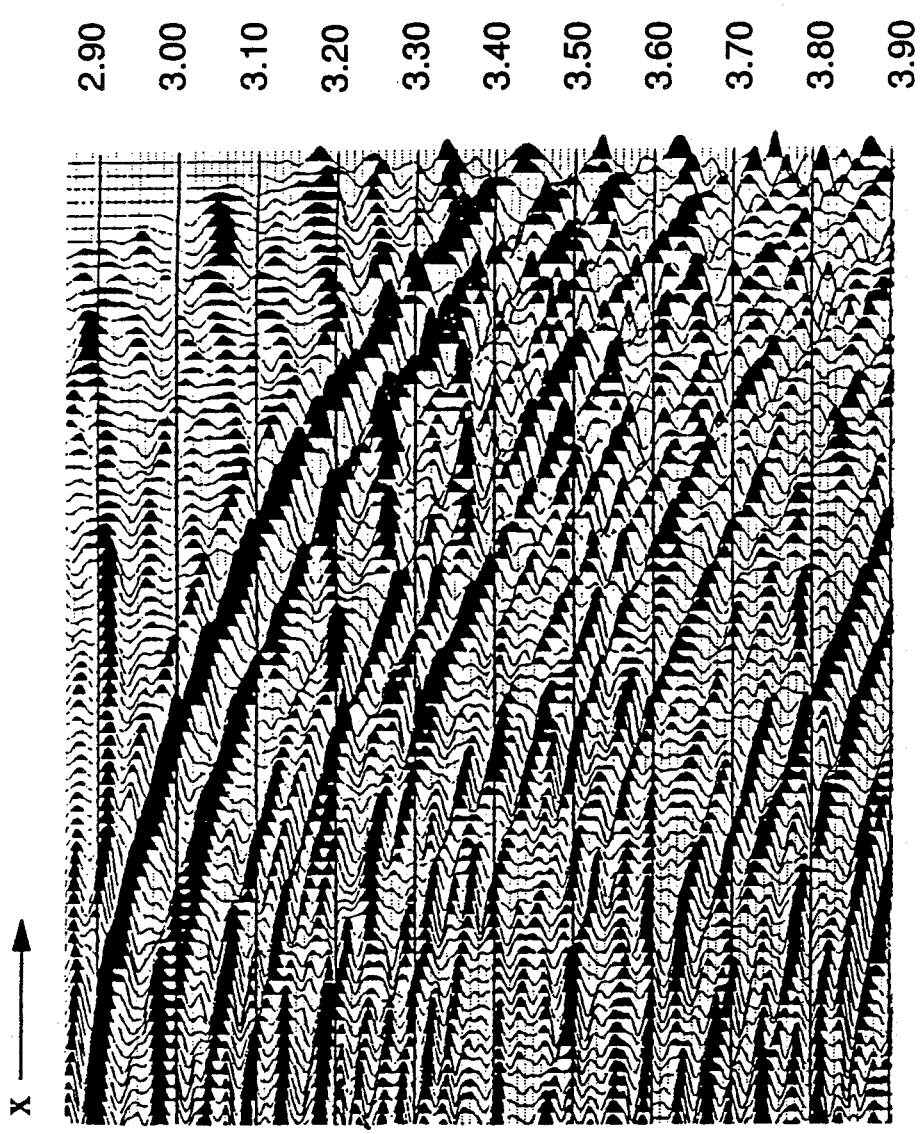
FIG. 1 is a representation of a CDP gather of seismic signals including a long period water bottom multiple reflection event.

At step 30, selected coherent events in each gather of seismic signals are aligned as shown in FIG. 1. It should be noted that the seismic data of FIG. 1 includes both horizontally aligned primary reflection events as well as a dipping multiple reflection event. Preferably, the coherent events are aligned by correcting for normal moveout variations so as to horizontally flatten them. The aligned events have been substantially horizontally flattened so as to have a wave number of K=0 in F-K space. As used herein, a coherent event comprises an event in two or more adjacent seismic signals having a well defined phase relationship such as primary and multiple reflection events as well as groundroll, refractions and other forms of coherent noise oftentimes found in seismic data.

Figure 3:
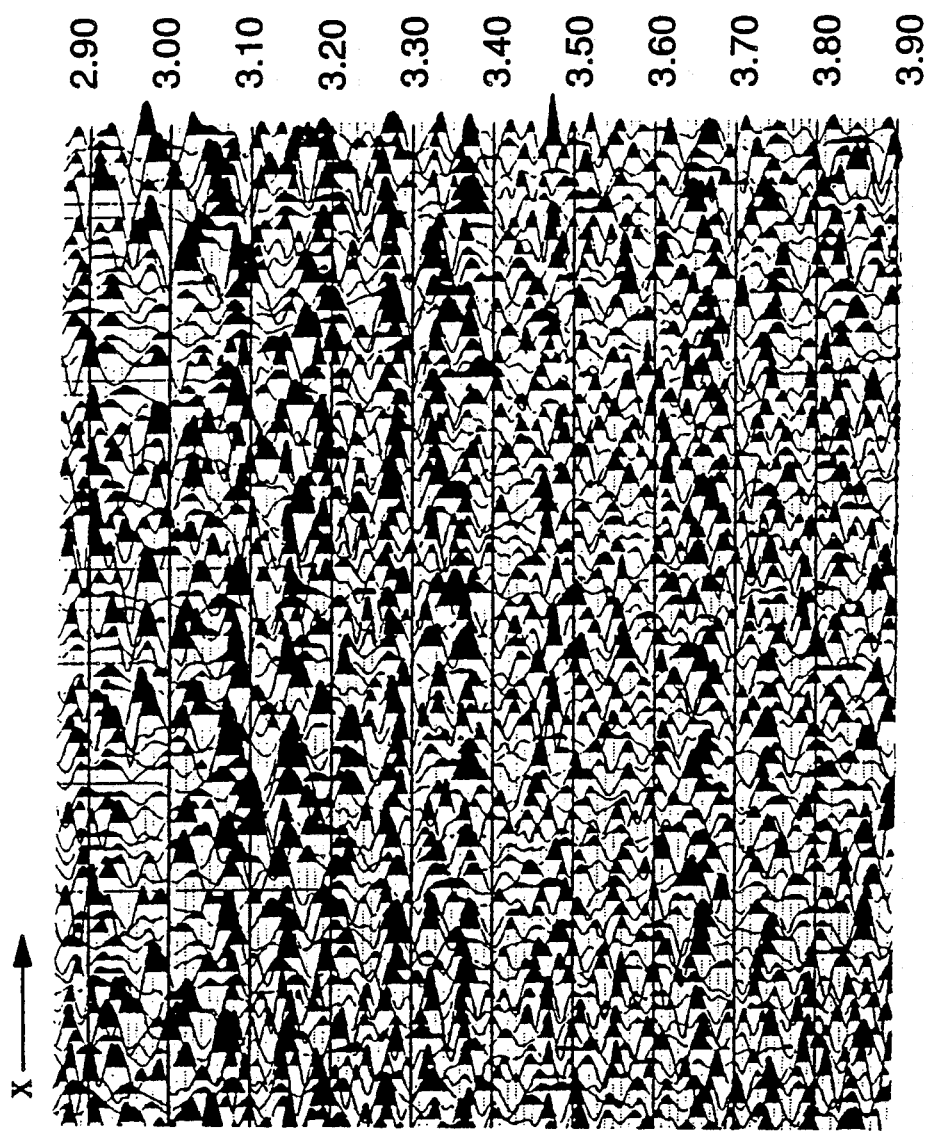
FIG. 3 is a representation of the seismic data of FIG. 1 after stochastically sorting the seismic signals.

At step 40, the ordered gathers of seismic signals from step 30 (and depicted in FIG. 1) are sorted so as to disorder the sequential order of the seismic signals in each gather as shown in FIG. 3. Preferably, each ordered gather of seismic signals is stochastically sorted so as to randomize the sequential order of the seismic signals. The effect of stochastically sorting the seismic signals is to transform the balance of the coherent events (i.e., those coherent events not aligned or horizontally flattened) into incoherent or randomized events. The stochastic sorting of the moveout corrected gathers of seismic signals does not affect aligned and substantially horizontally flat events but does transform dipping coherent events into incoherent events.

At step 50, the stochastically sorted gathers of seismic signals from step 40 are filtered with a two-dimensional filter so as to attenuate the incoherent events as well as random events therein. In particular, a spatial filter as described by Gulunay can be applied to each stochastically sorted gather of seismic signals to attenuate both incoherent and randomized events therein. Since the spatial filter operates in the (F-X) domain, those skilled in the art will appreciate that the seismic signals undergo a Fourier transformation so that the spatial filter can be constructed to operate in the (F-X) domain. By controlling the frequency passband and spatial extent of the F-X filter, events which are nonlinear in space and time (i.e., incoherent or random) and of selected frequencies can be attenuated.

The F-X filter described by Gulunay is an example of one type of two-dimensional filter. In fact, the two-dimensional filter of the present invention can also include such two-dimensional filters as median, alpha-trimmed mean and mix filters as well as F-K, velocity and pie-slice filters.

By use of return line 55, the steps of stochastically sorting and spatially filtering can be repeated several times to produce different random sorts for each gather of seismic signals so as to better attenuate both the incoherent and randomized events with the spatial filter. The combination of stochastically sorting moveout corrected gathers of seismic signals followed by two-dimensional filtering is more effective in attenuating both coherent noise and random noise because it takes advantage of the predictable nature of aligned primary reflection events in randomly sorted gathers and the unpredictable, incoherent nature of dipping multiple reflection events and random noise in randomly sorted gathers.

Figure 4:
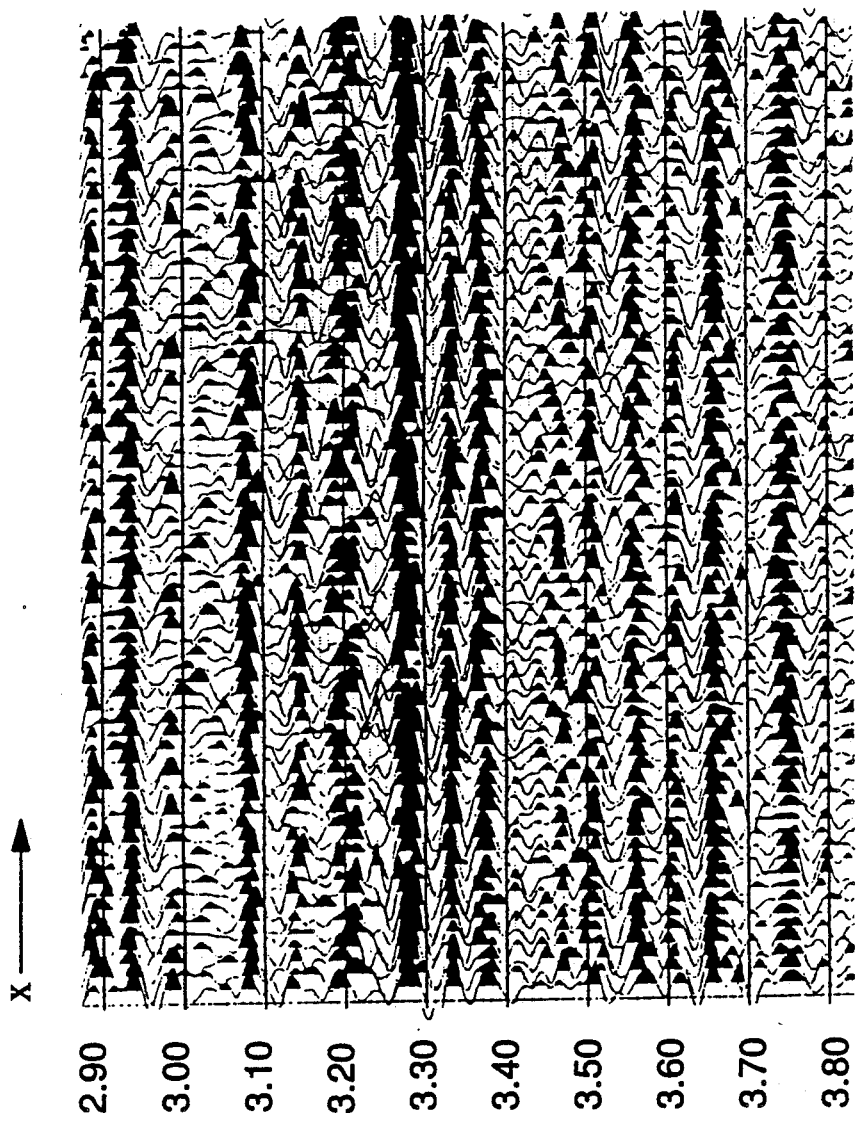
FIG. 4 is a representation of the seismic data of FIGS. 1 and 3 after processing in accordance with the present invention.
Figure 5:
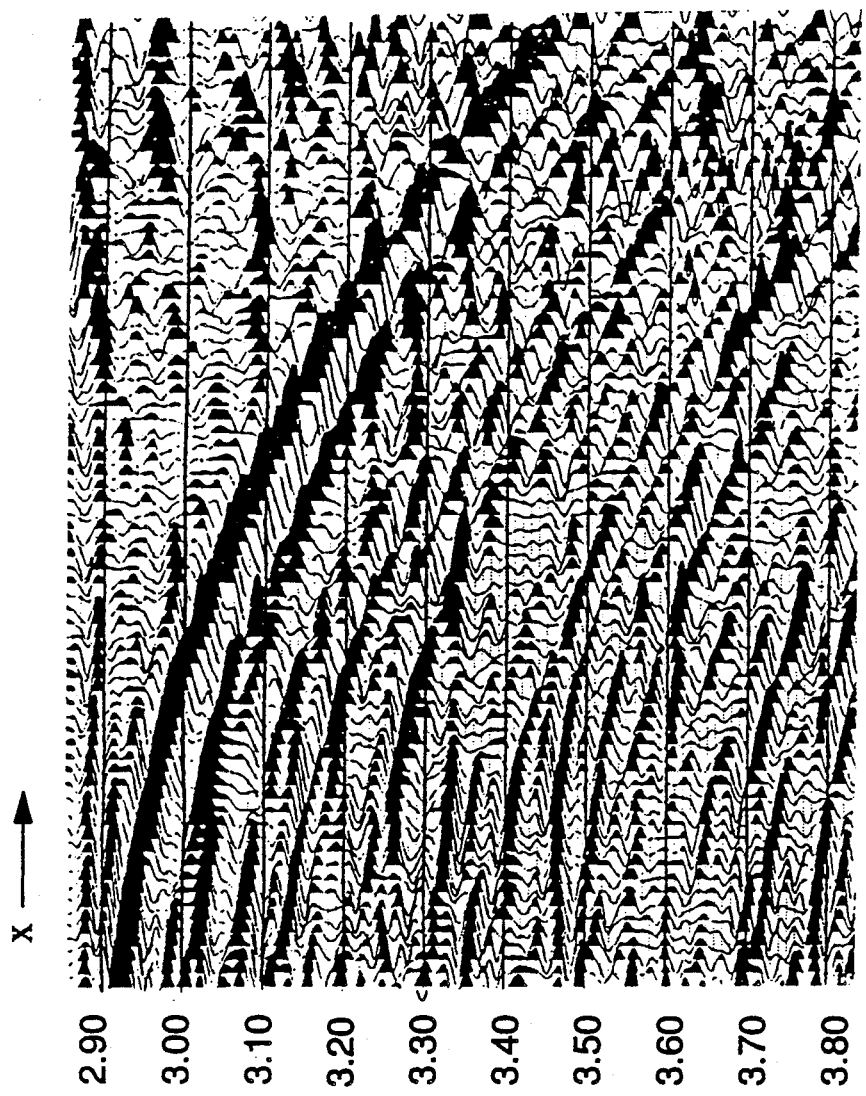
FIG. 5 is a representation of composite noise signals for the seismic data of FIG. 1.

At step 60, the filtered signals from step 50 are resorted into the original order to produce a gather of filtered signals as shown in FIG. 4. By return line 65, one can return to step 30 so as to align other select coherent events in the gather of seismic signals and then precede through steps 40 and 50 to attenuate those coherent events which were not aligned. Return line 65 is especially significant when the coherent events being aligned in step 30 comprise noise. Thus, the use of return line 65 allows one to create a composite filtered signal representative of all the coherent noise in the seismic signal such as shown in FIG. 5.

At step 70, the filtered signals of step 60, representative of a coherent noise contained therein can be combined with a respective gather of seismic signals to obtain a gather of seismic signals substantially free of unwanted coherent and random noise. In particular, the filtered signals representative of coherent noise (as depicted in FIG. 5) can be subtracted from their respective gather of seismic signals to obtain signals substantially free of unwanted noise (as depicted in FIG. 4).

After removal of the unwanted noise in the seismic signals, the seismic data can be resorted into ordered gathers of seismic signals whereby conventional processing and interpretation techniques can be applied to the seismic data. Because the processing technique of the present invention does not attenuate primary reflection events to the extent that conventional dip filtering techniques do, more accurate assessment of such hydrocarbon indicators as range dependent amplitude variations can be obtained.

EXAMPLE 1

Figure 6:
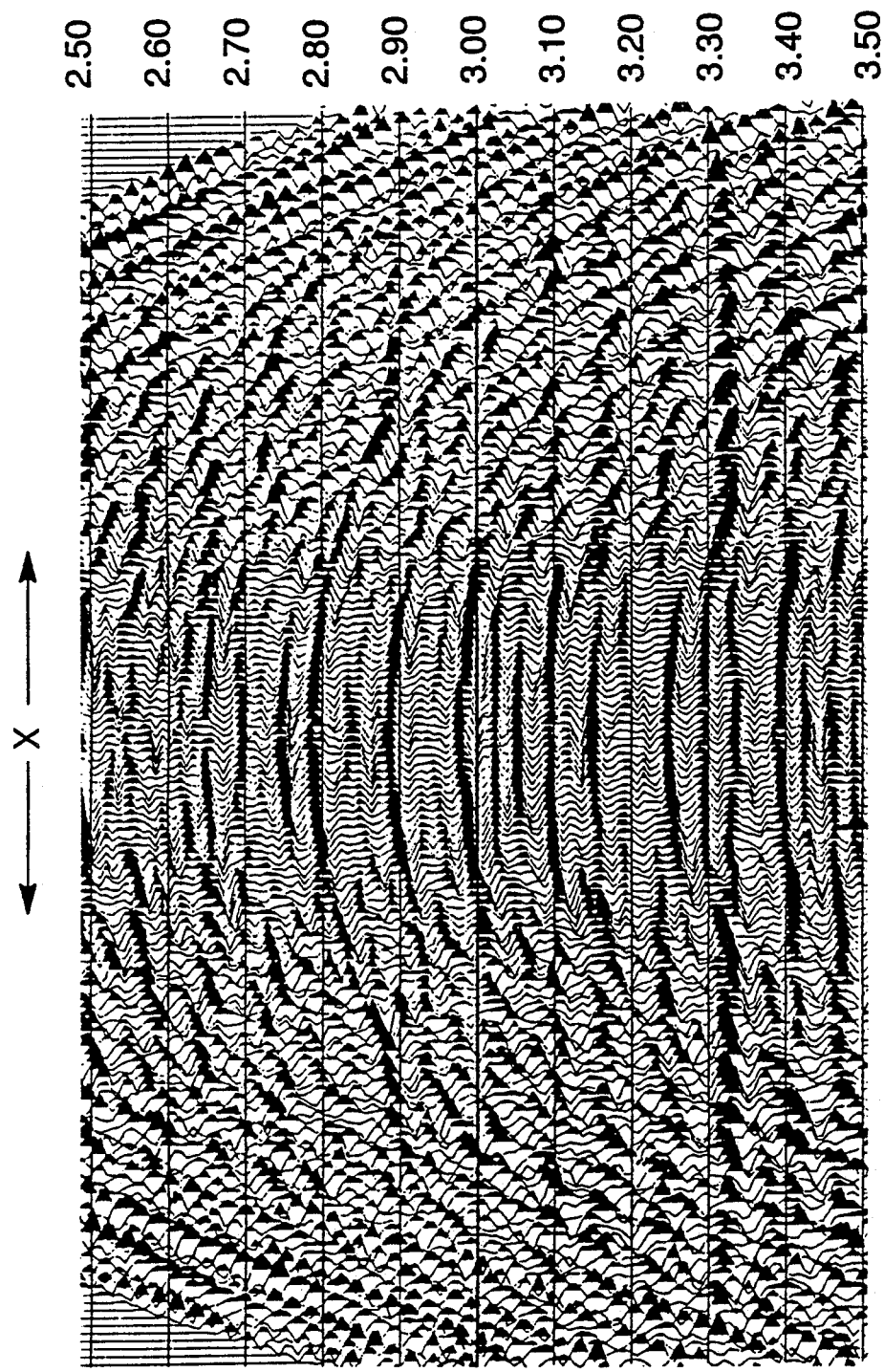
FIG. 6 is a representation of a CDP gather of seismic signals including short period peg leg multiple reflection events and linear refraction noise events.

The present technique was tested on a shallow water Gulf of Mexico seismic line where short period multiples and refractions interfered with the primary reflection events. The prospective formation is at approximately 3.3 seconds. CDP gathers of seismic signals in this area are dominated by interfering linear refractions and short period multiples as shown in FIG. 6. Conventional dip filtering methods in this area are effective at attenuating refractions but the process is expensive and ineffective for attenuating near offset multiples.

Figure 7:
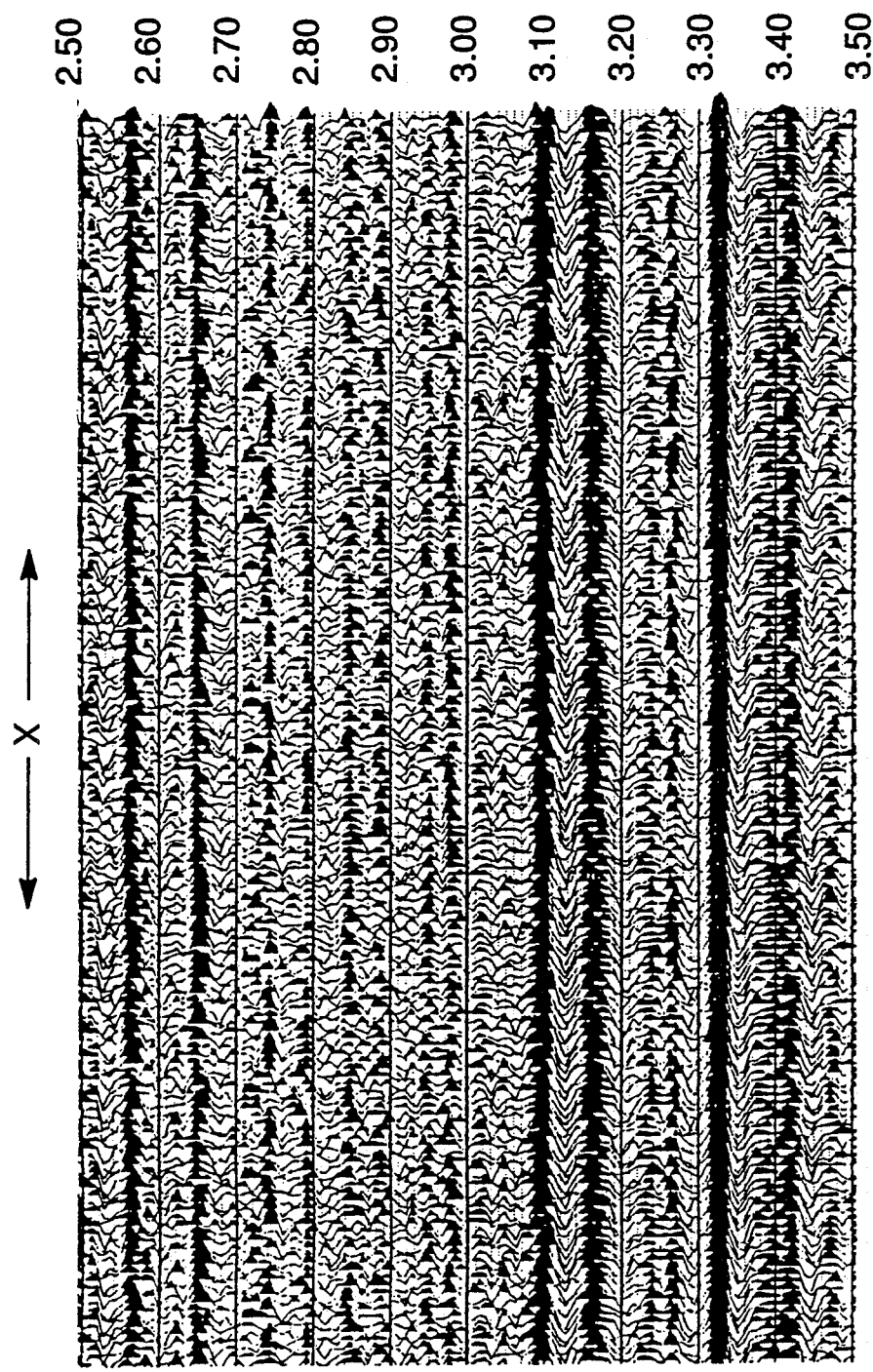
FIG. 7 is a representation of the seismic data of FIG. 6 after processing so as to suppress both multiple and refraction noise events as well as random noise therein.

The present technique was utilized to attenuate both the short period multiples and linear refractions in the seismic data of FIG. 6, and the results are shown in FIG. 7. The seismic signals of FIG. 7 retain the dominant primary reflection events, while the multiples and refraction events have been attenuated across all ranges. Unlike dip filtering, the present invention can attenuate multiples across all ranges, and the primaries are not altered by the spatial filtering. In contrast, dip filtering does not effectively attenuate multiples at the near offset distances where primaries or multiples have coincident dip rates.

EXAMPLE 2

Figure 8:
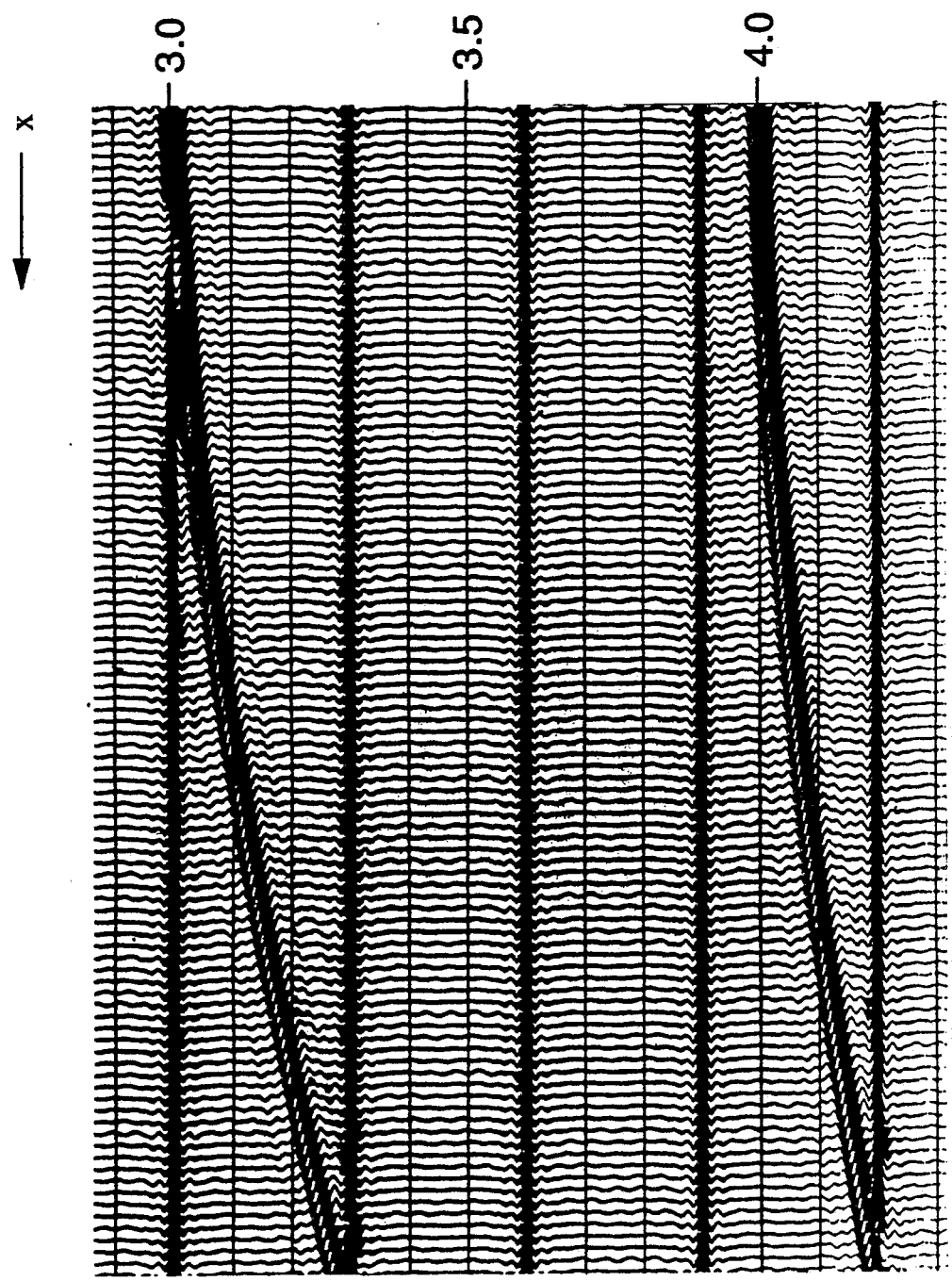
FIG. 8 comprises a moveout corrected CDP gather of synthetic seismic signals for a modeled formation having horizontal primary reflecting events and dipping multiple reflection events as well as ten percent random noise.
Figure 9:
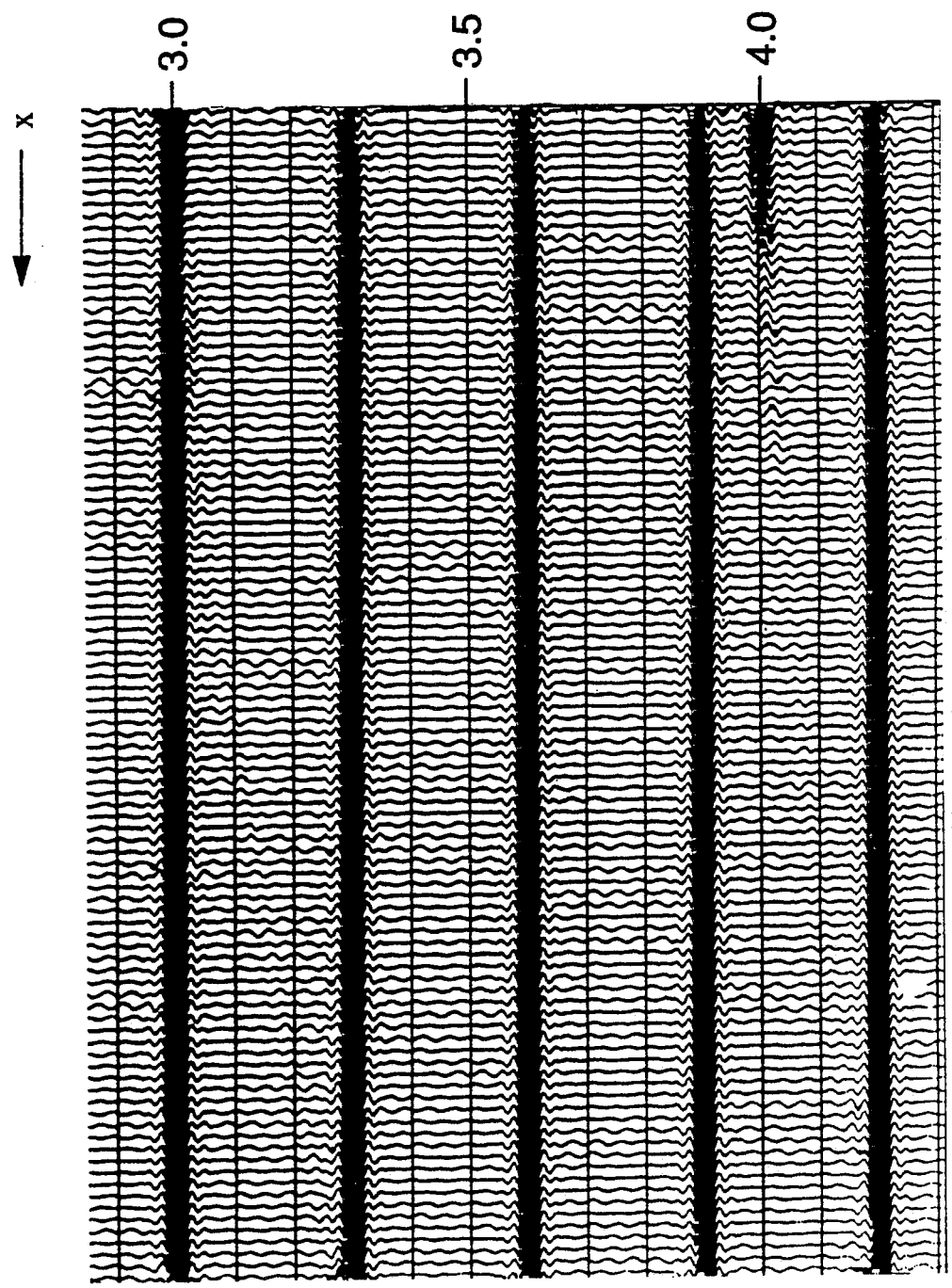
FIG. 9 is a representation of the seismic data of FIG. 8 after conventional dip filtering.
Figure 10:
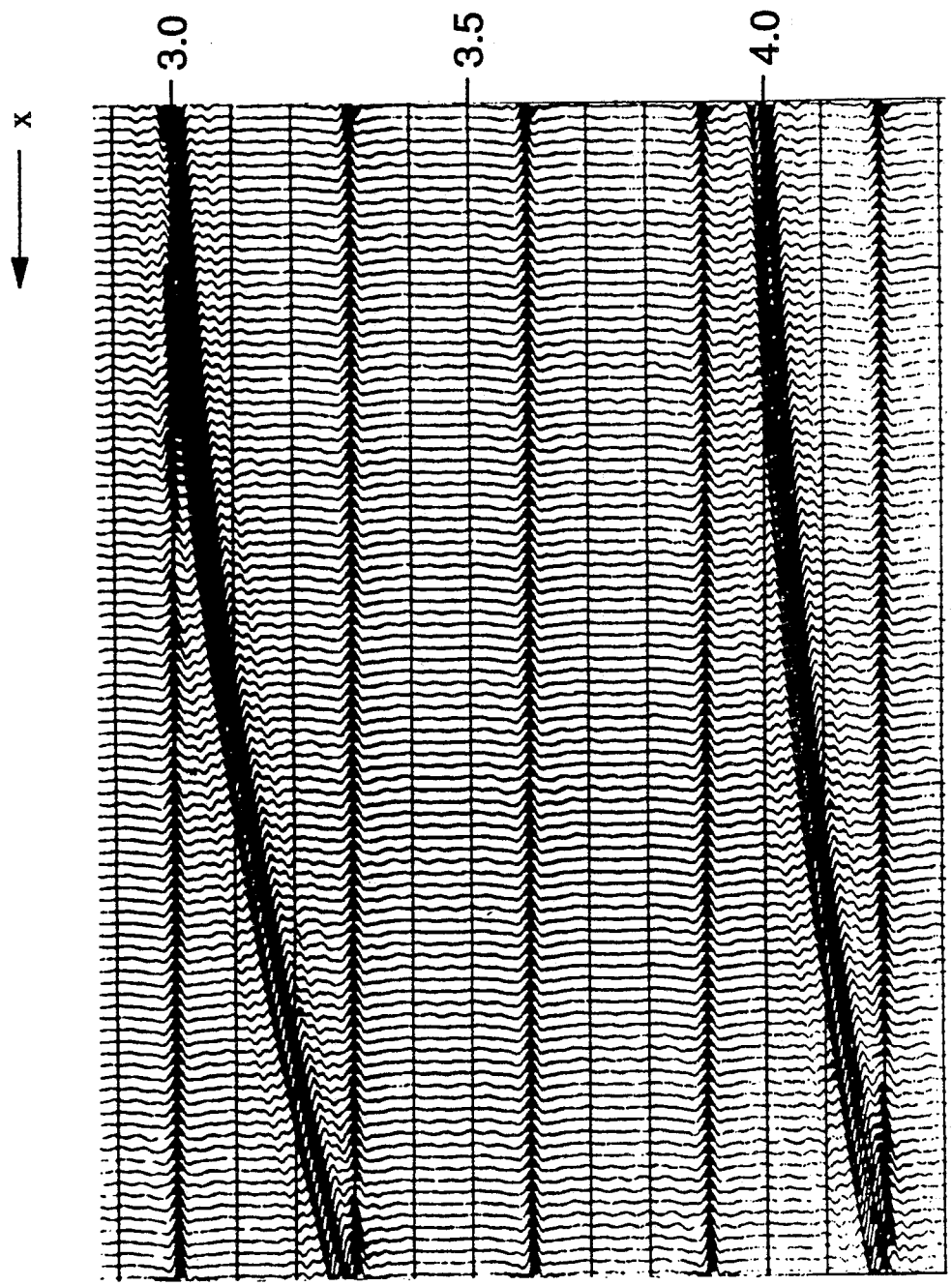
FIG. 10 is a representation of the noise as well as primary reflection events removed from the seismic data of FIG. 8 by the conventional dip filter.

Looking now to FIG. 8, a normal moveout corrected CDP gather of synthetic seismic signals are shown for a modeled formation. The seismic data of FIG. 8 includes substantially horizontally flattened primary reflection events and dipping multiple reflection events as well as ten percent random noise. FIG. 9 depicts the seismic data of FIG. 8 after conventional dip filtering to remove the dipping multiple reflection events. However, it is clear that not all of the dipping multiple reflection events have been removed. For example, the dipping reflection event at 4.0 seconds and at near offset distances is still present. FIG. 10 depicts a difference plot of FIGS. 8 and 9 and is thus representative of what the dip filter did remove. Here it can be seen quite clearly that the dip filter was less efficient at removing the multiples at near offset distances. Additionally, the dip filter had the further undesirable effect of attenuating a portion of the primary reflection events at 3.0, 3.3, 3.6, 3.9 and 4.2 seconds.

Figure 11:
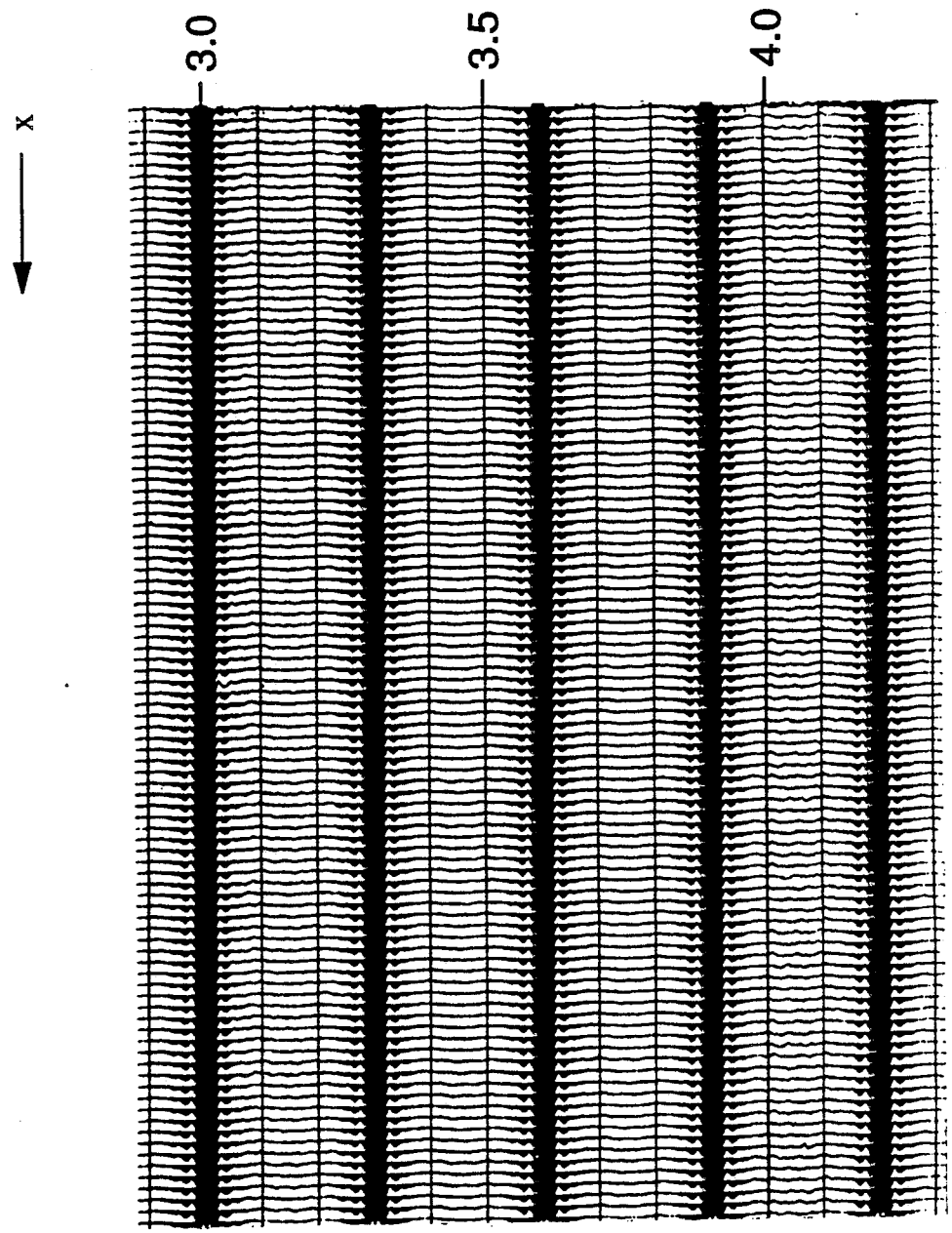
FIG. 11 is a representation of the seismic data of FIG. 8 after processing according to the present invention.
Figure 12:
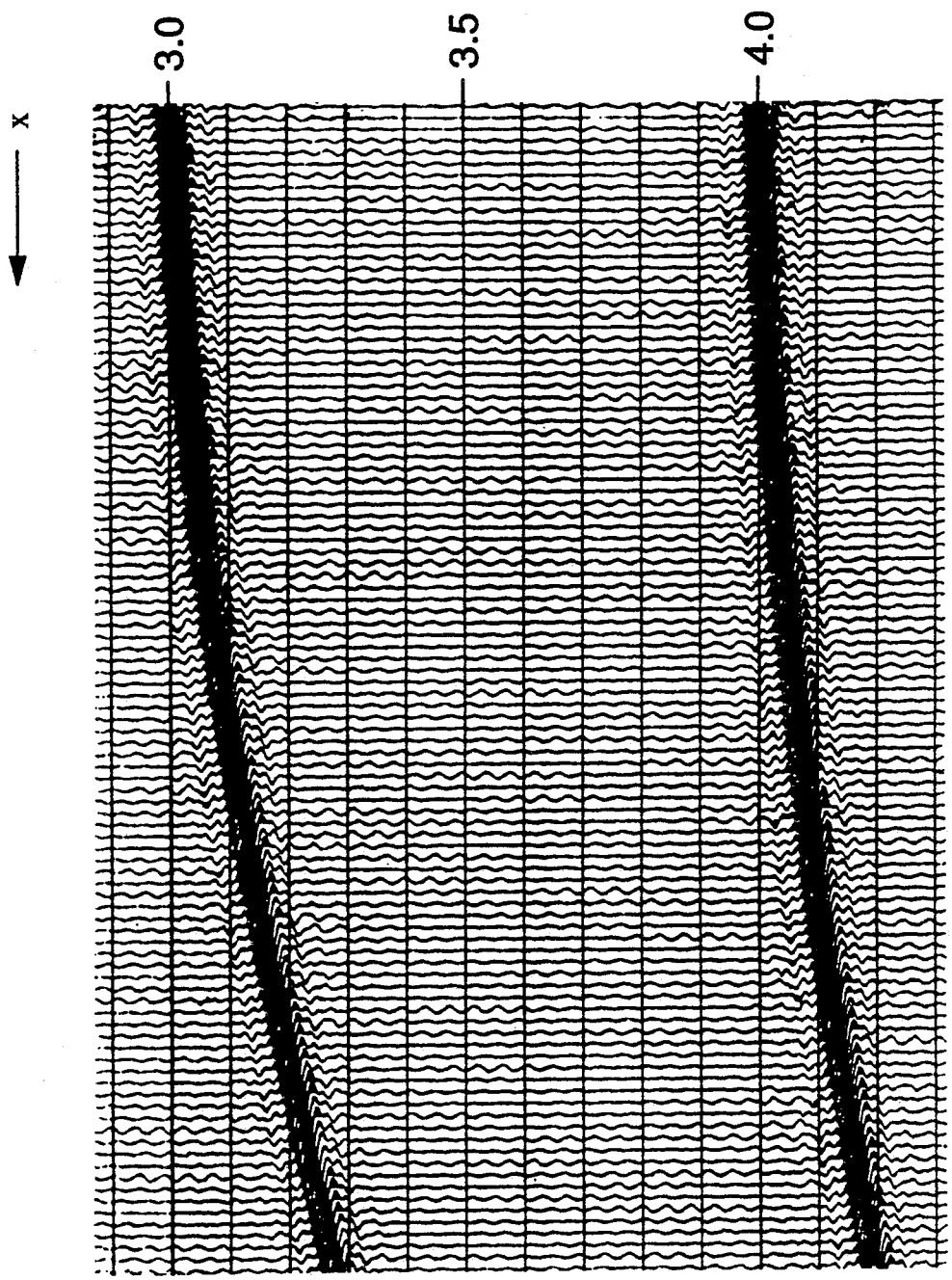
FIG. 12 is a representation of the noise removed from the seismic data of FIG. 8 by the present invention.

Looking now to FIG. 11, a representation is shown of the seismic data from FIG. 8 after processing according to the present invention. A comparison of FIGS. 9 and 11 indicates that the processing of the present invention is more effective at attenuating both multiple reflection events and random noise than conventional dip filtering. These differences are better highlighted in FIG. 12 which depicts a difference plot of FIGS. 8 and 11 and is thus representative of what processing according to the present invention did remove. Here it can be seen that the dipping multiple reflection events are effectively attenuated over all offset distances and that random noise has also been removed from the seismic data of FIG. 8.

Having described the present invention with respect to the use of spatially filtered, stochastically sorted gathers of seismic signals, those skilled in the art will appreciate that other modifications and variations of the present invention would be apparent for the removal of undesired noise in seismic data and are thus contemplated to fall within the scope of the claims provided.

I claim:

1. A method for enhancing seismic data, comprising the steps of:
    (a) obtaining a set of seismic data having gathers of seismic signals;
    (b) aligning selected coherent events in each gather of seismic signals;
    (c) transforming the remaining coherent events in each gather of seismic signals into incoherent events; and
    (d) attenuating the incoherent events from each gather of seismic signals.

2. The method of claim 1, further including the step of combining the attenuated signals of step (d) with their respective gather of seismic signals to obtain seismic data having an enhanced signal to noise ratio.

3. The method of claim 1, wherein the gathers of seismic signal comprise sequentially-ordered gathers of seismic signals selected from the group including: common depth point, common endpoint, incident angle ordered, and offset distance ordered gathers of seismic signals.

4. The method of claim 1, wherein the step of aligning comprises aligning selected primary reflection events.

5. The method of claim 1, wherein the step of aligning comprises aligning selected multiple reflection events.

6. The method of claim 1, wherein the step of aligning comprises normal moveout correcting selected coherent events.

7. The method of claim 1, wherein the step of aligning comprises horizontally flattening selected coherent events.

8. The method of claim 1, wherein the step of transforming comprises stochastically sorting the gathers of seismic signals into randomly ordered gathers of seismic signals.

9. The method of claim 3, wherein the step of transforming comprises sorting the sequentially ordered gathers of seismic signals into disordered gathers of seismic signals.

10. The method of claim 1, wherein the step of attenuating comprises spatial filtering each gather of seismic signals to suppress incoherent events.

11. The method of claim 10, wherein the step of spatial filtering includes F-X filtering.

12. The method of claim 1, wherein the step of attenuating includes two-dimensional filtering.

13. The method of claim 12, wherein the two-dimensional filter is selected from the group including dip filters, fan filters, velocity filters, pie-slice filters, median filters, alpha-trimmed mean, and mix filters.

14. The method of claims 8 or 9, further including the step of resorting the attenuated seismic signals into sequential ordered gathers.

15. A method for enhancing seismic data, comprising the steps of:
    (a) sorting the seismic data into sequentially-ordered gathers of seismic signals;
    (b) aligning selected coherent events in the sequentially-ordered gathers of seismic signals;
    (c) sorting the sequentially-ordered gathers of seismic signals into disordered gathers of seismic signals; and
    (d) two-dimensional filtering the disordered gathers of seismic signals to attenuate the balance of the coherent events to obtain first filtered signals.

16. The method of claim 15, further including the step of resorting the disordered gathers of the first filtered signals into sequentially-ordered gathers.

17. The method of claim 16, further including the step of combining the sequentially-ordered gathers of first filtered signals with their respective sequentially-ordered gathers of seismic signals to attenuate noise in each gather of seismic signals.

18. The method of claim 15, further including the steps of repeating steps (b), (c), and (d), so as to align additional selected coherent events and two-dimensional filtering such signals to attenuate the balance of coherent events and to obtain second filtered signals.

19. The method of claim 18, further including the step of combining the first and second spatially filtered signals to form gathers of composite filtered signals.

20. The method of claim 15, further including the steps of:
    (a) resorting the disordered gathers of the first filtered signals into second disordered gathers; and
    (b) two-dimensional filtering the resorted gathers to attenuate additional incoherent events in the seismic signals to obtain second filtered signals.

21. The method of claim 19 further including the step of combining each gather of composite filtered signals with its respective gather of seismic signals to attenuate noise in each gather of seismic signals.

22. The method of claim 21, wherein the step of combining comprises subtracting each gather of composite filtered signals from its respective gather of seismic signals.

* * * * *